United States Patent [19]

Cabib et al.

[11] Patent Number: 5,322,361

[45] Date of Patent: Jun. 21, 1994

[54] METHOD AND APPARATUS FOR MEASURING TEMPERATURE

[75] Inventors: Dario Cabib, Timrat; Michael E. Adel, Zikhron Yacov, both of Israel

[73] Assignee: C.I. Systems (Israel) Ltd., Migdal Haemek, Israel

[21] Appl. No.: 10,038

[22] Filed: Jan. 28, 1993

[51] Int. Cl.$^5$ .................. G01K 5/50; G01K 11/00; G01K 11/18

[52] U.S. Cl. .................. 374/161; 356/43; 356/44; 356/345; 374/120

[58] Field of Search ............. 374/161, 187, 188, 120; 356/43, 44, 345, 355, 357

[56] References Cited

U.S. PATENT DOCUMENTS

| | | | |
|---|---|---|---|
| 4,740,081 | 4/1988 | Martens et al. | 356/43 |
| 4,756,627 | 7/1988 | Nelson | 374/161 |
| 5,102,231 | 4/1992 | Loewenstein et al. | 374/161 |
| 5,221,142 | 6/1993 | Snow | 374/120 |

FOREIGN PATENT DOCUMENTS 0014729  1/1982  Japan .................. 374/161

Primary Examiner—Diego F. F. Gutierrez
Attorney, Agent, or Firm—Benjamin J. Barish

[57] ABSTRACT

A method and apparatus for measuring temperature by subjecting, to the temperature to be measured, a light-transmissive body of a material whose dimensions change in response to temperature, directing first rays of light from a light source through a first path including a predetermined distance of travel through the light-transmissive body, simultaneously directing second rays of light from the light source through a second path, parallel to the first path and of a linear length equal to that of the first path, but not including the predetermined distance of travel through the light transmissive body, and measuring the change in phases between the first and second light rays at the ends of the first and second paths, to thereby provide a measurement of the temperature to which the light-transmissive body was subjected.

20 Claims, 2 Drawing Sheets

METHOD AND APPARATUS FOR MEASURING TEMPERATURE

FIELD AND BACKGROUND OF THE INVENTION

The present invention relates to a method and apparatus for measuring temperature. The invention is particularly useful for measuring the temperature of a silicon or other semi-conductor materials during the processing thereof, and is therefore described below with respect to this application, although it will be appreciated that the invention could advantageously be used in other applications as well.

Rapid Temperature Processing (RTP) of silicon or other semi-conductor materials requires accurate measurement and control of temperature. In a typical RTP cycle, heating of the wafer to 1,200° C. takes place in seconds, making accurate control of the wafer temperature very crucial. The needed repeatability of temperature control from wafer to wafer is of the order of 1° C. Present temperature measurement techniques use a pyrometric based technology which has many drawbacks, including the following:

1. The roughness of the wafer surface affects its emissivity; therefore a remote pyrometric measurement depends on the accuracy with which this emissivity is known. Cumbersome calibrations with embedded thermocouples in test wafers are needed to know the wafer emissivity with sufficient accuracy.

2. Deposited, uncontrolled layers of oxides, nitrides, polycrystalline, silicon, etc. affect the emissivity of the wafer surface. Because of interference effects which depend strongly on the thickness of these layers, again cumbersome thermocouple calibrations are needed for each single wafer or for a wafer in a batch, to ensure temperature measurement accuracy.

A so-called "Ripple Technique" has been recently described, Schietinger et al., Mat.Res.Soc. Symp.Proc., Spring 1991, which takes advantage, (while using the pyrometric method), of the AC ripple of heating lamps as the signature of the reflected component of the radiation from the wafer surface to monitor the wafer emissivity. The disadvantage of this method is that its accuracy is a function of temperature: it is more accurate for high temperatures than for low temperatures.

OBJECTS AND BRIEF SUMMARY OF THE INVENTION

An object of the present invention is to provide a method and apparatus for measuring temperature having advantages in some or all of the above respects.

According to the present invention, there is provided a method of measuring temperature, comprising: subjecting, to the temperature to be measured, a light-transmissive body of a material whose dimensions change in response to temperature; directing first rays of light from a light source through a first path including a predetermined distance of travel through the light-transmissive body; simultaneously directing second rays of light from the light source through a second path, parallel to the first path and of a linear length equal to that of the first path, but not including the predetermined distance of travel through the light-transmissive body; and measuring the change in phases between the first and second light rays, at the ends of the first and second paths, to thereby provide a measurement of the temperature to which the light-transmissive body was subjected.

According to a further feature in the described preferred embodiments, the light-transmissive body is of a material whose index of refraction also changes in response to temperature. Particularly good results have been obtained when the light-transmissive body is of sapphire.

It will thus be seen that the above temperature measuring method is based on an interferometric technique, i.e., on measuring the change in phases produced by two light rays travelling different paths, one of which paths is more affected by the temperature than the other path. The interferometric method of temperature measurement in accordance with the present invention provides a number of advantages which are particularly important in the rapid temperature processing of silicon or other semi-conductor materials, including the following:

1. it is absolute and does not require thermocouple calibration with temperature cycling;

2. it is useful for all temperatures, from below room temperature to high temperatures;

3. it may utilize a temperature probe which is very small, of the order of a millimeter, so that its effect on the temperature uniformity of the wafer is minimal;

4. it is not affected by different degrees of roughness on the back surface of the wafer; and 5. it is not affected by the presence of layers on the back surface, such as $SiO_2$, polysilicon, silicon nitride, and other materials which may be present.

Several embodiments of the invention are described below, for purposes of example.

In two described embodiments, the light-transmissive body includes a gap filled of another light-transmissive material which gap is in the second path but not in the first path. Particularly good results are obtainable where the gap is of air.

According to one described embodiment, the light-transmissive body includes a first 45° reflector surface at the light source end thereof for reflecting the first and second rays through the light-transmissive body via the first and second paths, respectively; and a second 45° reflector surface at the opposite end of the light-transmissive body for reflecting the first and second rays to a common detector.

According to a second described embodiment, the light-transmissive body includes a 45° reflector surface at the light source end thereof for reflecting the first and second rays through the light-transmissive body via the first and second paths; and a 90° reflector surface at the opposite end of the light-transmissive body for reflecting the first and second rays back through the first and second paths to a common detector at the light-source end of the light-transmissive body. Thus, the sensitivity of the latter embodiment is increased because the light rays pass through an OPD (optical path difference) which is twice as long as the first embodiment.

A third embodiment is described, wherein the first light rays are directed to pass through the surface of the light-transmissive body facing the light source and to be reflected from the opposite surface of the light-transmissive body back through the body to a detector; and the second light rays are directed to be reflected from the surface of the light-transmissive body to the detector. More particularly, in this described embodiment, the opposite surface of the light-transmissive body includes an interface having an amplitude-reflection coefficient which is approximately equal to that of the interface at the surface of the light-transmissive body facing the light source. Particularly good results are obtainable when the light-transmissive body is sapphire, the interface at the surface of the light-transmissive body facing the light source is an air-sapphire interface, and the interface at the opposite surface of the light-transmissive body is a sapphire-silicon interface.

The invention also provides apparatus for measuring temperature in accordance with the above method.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
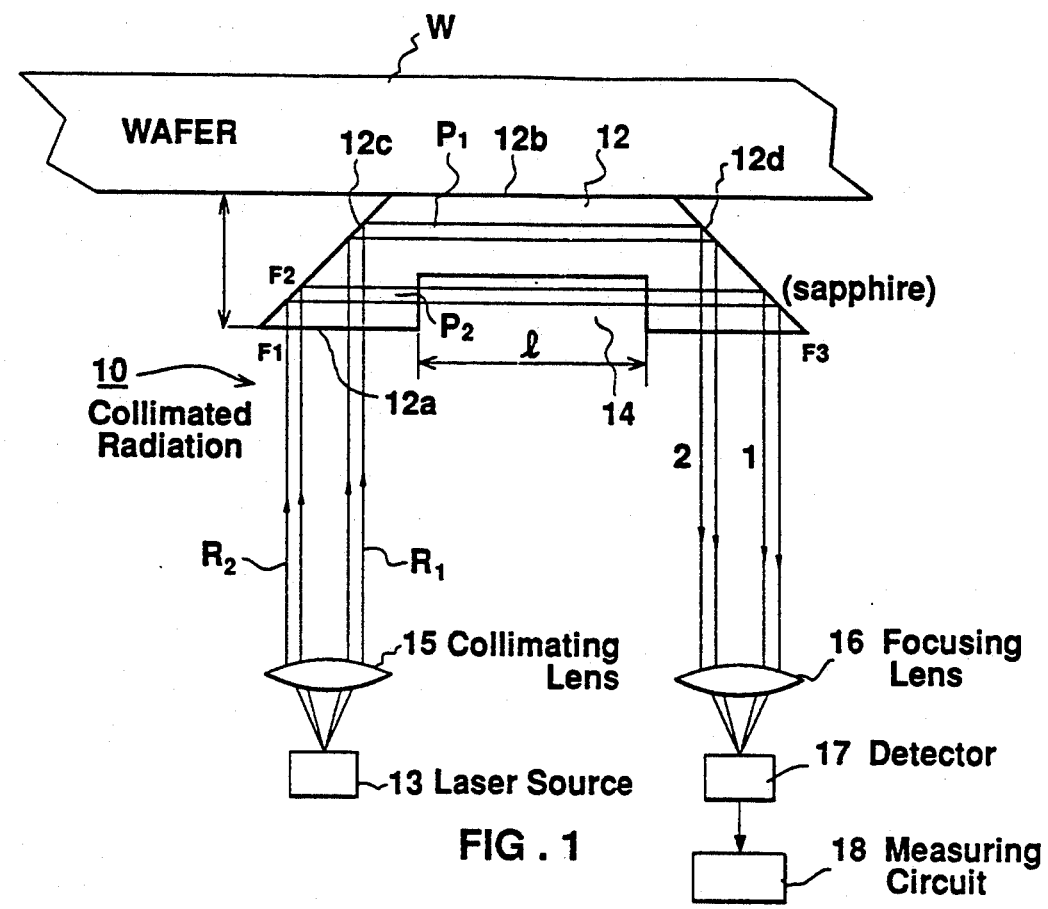
FIGS. 1, 2 and 3 diagrammatically illustrate three types of apparatus constructed in accordance with the invention for measuring temperature.

The Embodiment of FIG. 1

FIG. 1 illustrates one form of apparatus, generally designated 10, for measuring the temperature of a silicon or other semi-conductor wafer W. The illustrated apparatus includes a temperature probe 12 of light-transmissive material having one surface in contact with the wafer W whose temperature is to be measured. The light-transmissive body 12 in this example is of sapphire and is of trapezoidal configuration. Thus, it includes two opposed parallel surfaces, namely surface 12a facing a light source 13, and surface 12b in contact with the wafer W whose temperature is to be measured. The trapezoidal sapphire body 12 includes two opposed non-parallel surfaces 12c and 12d, both cut at a 45° angle to surface 12a.

The trapezoidal sapphire body 12 is further formed with a rectangular recess 14 extending for a part of the thickness of the body starting from surface 12a and terminating short of surface 12b; its length is indicated as "1". This recess 14 is filled with air, and therefore defines an air gap within the sapphire body 12.

Light source 13 is a laser of monochromatic radiation. The light is collimated by a collimating lens 15 and is directed to one end of the sapphire body 12 through surface 12a so as to be reflected by the 45° surface 12c. It will thus be seen that one bundle of rays, indicated as $R_1$, passes through the sapphire body 12 via a first path, indicated at $P_1$, which path does not include the air gap 14; whereas a second bundle of rays $R_2$ passes through the sapphire body 12 along a second path $P_2$, which latter path does include the air gap 14.

Both bundles of rays $R_1$, $R_2$ are reflected by the sapphire-air interface at the 45° surface 12d of the sapphire body 12 out of the body to a focussing lens 16 which focusses the rays to a common focal point on a detector 17.

Interference is caused by the change in phase between the two bundles of rays travelling through paths $P_1$, $P_2$, because of the optical path difference (OPD); therefore the signal outputted by the detector 17 will be a function of the OPD. The latter signal is fed to a measuring circuit 18 which measures the OPD to provide a measurement of the change in phase, and thereby of the temperature to which the wafer W was subjected.

The sapphire body 12 has relatively small dimensions; for example, its largest dimension (along surface 12a) is 3 mm or less, and its opposite surface 12b, in contact with the wafer W, may be 1-2 mm. Its surface 12b is flat and well polished to optical quality, so as to be in good thermal contact with the wafer W. Because of its small size, it quickly heats and cools with minimal gradients through the material itself, and can therefore be assumed to be at the same temperature as the wafer. This is true for all chamber pressure above about 10 mTorr.

As the sapphire body 12 changes its temperature, to follow the wafer temperature, two physical effects occur:

1. its dimensions increase because of thermal expansion; and
2. its index of refraction increases because of its positive temperature coefficient.

These two effects contribute to an OPD which depends on temperature. As the temperature changes, the detector signal varies continuously from constructive to destructive interference and goes through maxima and minima. The detector signal is therefore a measure of the temperature of the wafer which produced the phase difference in the two light paths.

The following discussion will show that all sources of inaccuracies in the above temperature measurement procedure will add up to a total error of not larger than 1° C.

Mathematical Analysis

Because of roughness of the back surface of the wafer W, the thermal contact of the sapphire body 12 with the wafer surface may not be very good. This brings about a temperature gradient between the wafer W and the sapphire body 12, which may be estimated as follows.

Let us take the worst case in which the interface between the wafer and the sapphire body 12 is an air layer of constant thickness (t) and thermal conductivity of air. This is the worst case situation because in practice there are points of contact between the wafer and the sapphire body 12, so that the effective thermal conductivity of this layer is somewhat larger than the thermal conductivity of air.

If the maximum gradient in a direction perpendicular to the wafer is 1000° C./cm (in a worse case situation), then the temperature gradient through a 1 μ air layer is at most:

$$\Delta T_{air} = 1000° \text{ C./cm} \times 1\mu = 0.1° \text{ C.} \quad (1)$$

This is an order of magnitude of less than the temperature accuracy required by the measurement.

Let us now estimate the temperature gradient through the sapphire body 12. From FIG. 1, assume a sapphire body 12 of a thickness equal to d.

From the equation of steady state heat flow, and assuming a heat flow in a direction perpendicular to the wafer, we have:

$$\frac{K}{d} \Delta T_{ITP} = K_{air} G \quad (2)$$

where $T_{ITP}$ is the temperature gradient through the sapphire body 2 of a thickness d, K is the thermal conductivity of Sapphire $K_{air}$ is the thermal conductivity of air, and G is the overall temperature gradient 1000° C./cm.

Assuming $$K_{air} = 2 \times 10^4 \text{ cal/cm C sec,} \qquad (3)$$

K of sapphire is given in the literature at 400° C., $$K = 3 \times 10^{-2} \text{ cal/cm C sec,} \qquad (4)$$

then $$\Delta T_{ITP} = \frac{2 \times 10^{-4} \times 10^3}{3 \times 10^{-2}} d = 7d \qquad (5)$$

since we want $\Delta T_{ITP} \leq 0.1C$, so that it is significantly less than the required temperature accuracy of 1° C., we have the condition on d:

$$d \leq \frac{0.1}{7} \text{ cm} = 140\mu \qquad (6)$$

ITP Response Time

The response time is estimated to be of the order of the diffusion time of a one-dimensional heat flow through the ITP in a direction perpendicular to the wafer. This must be less than the minimum time required for the wafer to heat up by 1C. Since a typical wafer heating rate is 1000° C. in 30 sec., the ITP response time must be shorter than 30 msec.

For an order of magnitude estimate we can use the following relation:

$$\tau \cong \frac{d^2}{k} \qquad (7)$$

where $\tau$ is the response time or the heat diffusion time, and k is the sapphire diffusivity:

$$k^* = \frac{K}{\rho C} = \frac{3 \times 10^{-2}}{4 \times 0.1} = 7.5 \times 10^{-2} \frac{cm^2}{sec} \qquad (8)$$

From (7) and (8), $$\tau = 13.3 d^2 \qquad (9)$$

If we impose the condition $$\tau \leq 30 \text{ msec,} \qquad (10)$$

$$d \leq 470 \mu. \qquad (11)$$

A comparison of (11) with (6) shows that if (6) is satisfied, then also (11) is satisfied.

Sensitivity of the ITP Method

In order to estimate the sensitivity of the method we must calculate the signal variation versus ITP temperature, and compare with the attainable signal to noise ratio of the detector.

First some definitions:
l = length of the ITP (see FIG. 1)
n = 1.8 index of refraction of sapphire
Io = power flux of the laser diode output in the collimated beam
$\alpha$ = diameter of the collimated beam
$\lambda$ = wavelength of the laser radiation The Optical Path Difference (OPD) between ray 1 and 2 (see FIG. 1) is $$OPD = (n-1)l \qquad (12)$$

We note that there are two phase changes of n at the interfaces of total internal reflection for the polarization parallel to the plane of incidence: these phase changes occur in pairs, so they amount to no change.

The intensity of the radiation at the detector is therefore, approximately, $$I = t^2 I_o \left(1 + t^2 \cos \frac{2\pi}{\lambda} OPD \right) = \qquad (13)$$

$$t^2 I_o \left(1 + t^2 \cos \left[\frac{2\pi}{\lambda} (n-1)l\right]\right)$$

where:

$$t^2 = \frac{4}{(1+n)^2}$$

is the transmission coefficient through each air-sapphire interface.

This expression has maxima equal to $t^2 I_o (1+t^2)$ and minima equal to $t^2 I_o (1-t^2)$.

In practice, both the maxima of (13) and the contrast or maximum amplitude between maxima and minima are smaller than Io, because of losses at the interfaces. However, these losses are relatively small, because the transmission coefficient at each interface is fairly large (92% at each interface), and there are no losses at the total internal reflections. Eq. (13) has maxima for $$\frac{(n-1)l}{\lambda} = k \qquad (14)$$

where k is an integer (the order of interference), and minima for $$\frac{(n-1)l}{\lambda} = k + \frac{1}{2} \qquad (15)$$

At room temperature the intensity at the detector is $$I_{R.T.} = t^2 I_o \left(1 + t^2 \cos \left[\frac{2\pi}{\lambda} (n_o - 1)l_o\right]\right) \qquad (16)$$

where $n_o$ and $l_o$ are the values of n and l at room temperature respectively. These values must be known very accurately at room temperature, as it will be seen below.

n and l are functions of temperature, as follows:

$$n = n_o + 13 \times 10^{-6} T \qquad (17)$$

$$l = l_o(l + 7 \times 10^{-6} \Delta T) \qquad (18)$$

where $\Delta T$ is the temperature difference $$\Delta T = T - T_o \qquad (19)$$

between the ITP temperature T and room temperature To. The temperature difference $\Delta T$ needed for the signal to go from one maximum to the next is such that $$\frac{\Delta T}{\lambda} \frac{d}{dT}[(n-1)l] = 1 \qquad (20)$$

dn is the temperature coefficient of the refraction index of sapphire $dn = 13 \times 10^{-6}$ C$^{-1}$.
which means $$\Delta T = \frac{\lambda}{\frac{d}{dT}[(n-1)l]} = \frac{\lambda}{l\frac{dn}{dT} + (n-1)\frac{dl}{dT}} = \qquad (21)$$

$$\frac{\lambda}{l\left[\frac{dn}{dT} + (n-1)\alpha\right]}$$

where, from (18), $\alpha$ is the thermal expansion coefficient of sapphire:

$$\alpha = 7 \times 10 \text{ C} \qquad (22)$$

and dn/dT is the temperature coefficient of the refraction index of sapphire dn/dT=$13 \times 10^{-6}$ C-1. Eq. (21) can be used to establish l by approximating l=lo and n=no, and by establishing the desired $\Delta T$ corresponding to a change of k by one unit.
For example, if we require $\Delta T = 2C$, then $$l_o = \frac{\lambda}{2\left[\frac{dn}{dT} + (n-1)\alpha\right]} = \qquad (23)$$

$$\frac{0.5\lambda}{13 \times 10^{-6} + 5.6 \times 10^{-6}} = 2.7 \times 10^4 \lambda$$

If $\lambda = 0.5\mu$, then $$l_o = 1.3 \text{ cm} \qquad (24)$$

This situation corresponds to a change of 1C on going from a maximum to next neighbor minimum.
However, if we require T=20C, then $$l_o = 1.3 \text{ mm} \qquad (25)$$

In this case the total elongation for 1000C difference is $9\mu$, and the number of oscillations is 50 because $$50\Delta T = 1000° \text{ C}. \qquad (26)$$

A $\Delta T = 1C$ resolution means a phase measurement resolution of $$\frac{2\pi \frac{d}{dT}[(n-1)l]}{\lambda} = \frac{2\pi(1.3 \times 7 \times 0.8 \times 10^{-6} + 1.3 \times 13 \times 10^{-6})}{0.5 \times 10^{-3}} = 0.35 \text{ rad } \sim 20° \qquad (27)$$

If the initial temperature is To and the signal is at a maximum, then there is an integer ko, such that $$\frac{(n_o - 1)l_o}{\lambda} = k_o \qquad (28)$$

If the wafer is heated to a temperature t, then $$\frac{(n-1)l}{\lambda} = k + x \qquad (29)$$

and $$x = \frac{1}{2\pi} \cos^{-1}\left(\frac{S(T) - \frac{(S_{max} + S_{min})}{2}}{\frac{(S_{max} - S_{min})}{2}}\right) \qquad (30)$$

where k is the largest integer smaller than (n-31 1) l/$\lambda$, S(T) is the signal at temperature T, Smax-Smin is the amplitude of the fringes and (Smax+Smin)/2 is the average signal. Since $$\frac{(n-1)l}{\lambda} = \frac{(n_o - 1)l_0}{\lambda} + \frac{1}{\lambda} \frac{d}{dT}[(n-1)l](T - T_o) = \qquad (31)$$

$$k_o + \frac{1}{\lambda} \frac{d}{dT}[(n-1)l](T - T_o),$$

then $$\frac{(n-1)l}{\lambda} - \frac{(n_o - 1)l_o}{\lambda} = (k - k_o) + x = \qquad (32)$$

$$\frac{1}{\lambda} \frac{d}{dT}[(n-1)l](T - T).$$

k and ko are measured, x is found from (30), $\lambda$, dn/dT and dl/dT are known; then before T is found from (32):

$$T = T_o + \frac{k - k_o + x}{\frac{l_o}{\lambda}\left[\frac{dn}{dT} + (n_o - 1)\alpha\right]} \qquad (33)$$

Measurement Procedure

The measurement procedure is as follows:
1. Before turning on the RTP chamber, the chamber temperature is measured to an accuracy of ±1C.
2. The interference signal at this temperature is measured and recorded.
3. Assuming that initially the ITP is in thermal equilibrium with the chamber, all subsequent changes of signal going through maxima and minima are referred to the initial signal, including counting the number of fringes, both increasing (when the temperature increases), and decreasing (when the temperature decreases).
This requires that we continuously keep track, not only of the signal itself, but also of the direction in which the fringes move, both in the presence and in the absence of the wafer in the chamber.
4. The temperature T of the wafer is calculated from Eq. (33).

Figure 2:
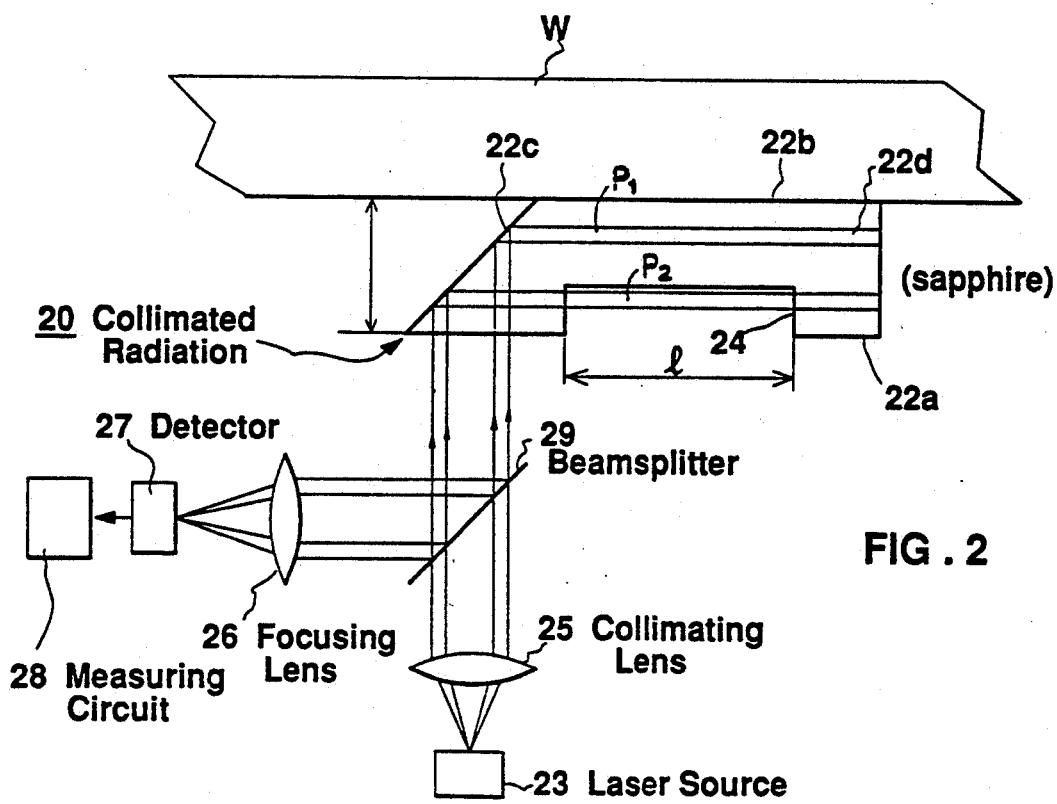

The Embodiment of FIG. 2

FIG. 2 illustrates a second form of apparatus, generally designated 20, which is very similar to that of FIG. 1, in that it also includes a temperature probe 22 of sapphire having one surface 22a facing the light source 23, and the opposite surface 22b in contact with the wafer W whose temperature is to be measured. As in FIG. 1, the sapphire body 22 is also formed with a rectangular recess 24 extending for a part of the thickness of the body and defining an air gap.

In the apparatus of FIG. 2, the sapphire body 22 is also of trapezoidal configuration. As in FIG. 1, one non-parallel surface 22c receives the light from laser source 23 via collimating lens 25 and reflects the light via a first path $P_1$ which does not include the air gap 24, and through a second path $P_2$ which does include the air gap 24. However, in the FIG. 2 arrangement, the opposite, non-parallel surface 22d of the sapphire body 22 is at 90° to surfaces 22a, 22b, so that both beams are returned via the same paths $P_1$, $P_2$ and are reflected back via surface 22c out of the sapphire body to a beam splitter 29, which passes the entering light but reflects the exiting light to a focussing lens 26, detector 27 and measuring circuit 28.

It will be seen that the apparatus illustrated in FIG. 2 operates in the same manner as described above -with respect to FIG. 1, except that the sensitivity of the FIG. 2 apparatus is multiplied by a factor of "2" over that of FIG. 1 because the light beams go through an OPD which is twice as long as in FIG. 1.

Figure 3:
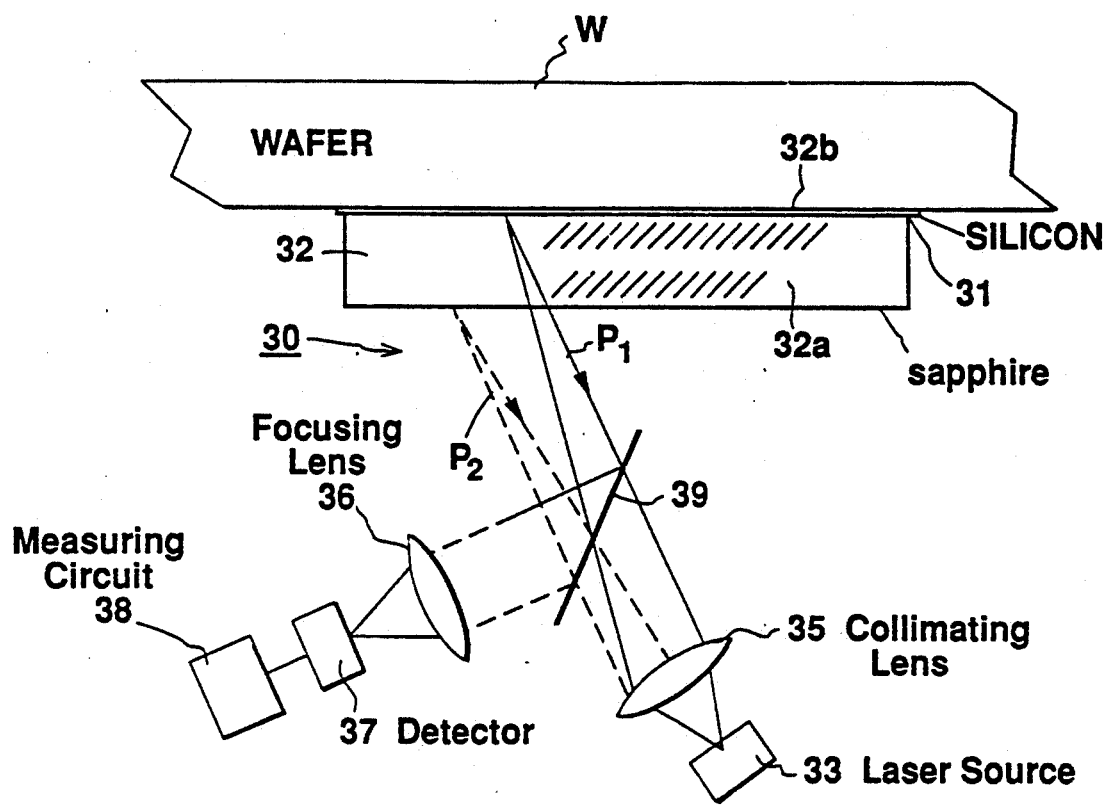

The Embodiment of FIG. 3

FIG. 3 illustrates a third form of apparatus for measuring the temperature of a silicon or other semi-conductor wafer W which does not include an air gap in the sapphire body 32. In this case, the OPD is obtained by reflecting one beam from one face, 32a, of the sapphire body 32, and the other beam from the opposite face 32b in contact with the wafer W.

Thus, in the apparatus illustrated in FIG. 3, the sapphire body 32 is in the configuration of a parallelepiped, having one face 32a facing the light (e.g., laser) source 33, and the opposite face 32b in contact with the wafer W. Face 32a forms an air/sapphire interface, and face 32b is coated with a thin silicon film 31 to define a sapphire-silicon interface having a reflection coefficient which is approximately equal to that of the air-sapphire interface 32a. For example, the air-sapphire interface 32a may have an amplitude reflection coefficient ($r_1$) of approximately 0.29, whereas the sapphire-silicon interface 31 may have an amplitude reflection coefficient ($r_2$) approximately 0.32. In such a case, the amplitude of the interference maxima and minima between the beams reflected from these two interfaces, as shown in FIG. 3, is maximized.

Thus, the light beam from light source 33, and collimated by lens 35, passes through a first path $P_1$ which includes the sapphire body 32, and through a second path $P_2$ which does not include the sapphire body. Both beams are reflected from their respective interfaces via a beam splitter 39 and focussing lens 36 to a detector 37. The detected signal is measured by a measuring circuit 38, to produce a measurement of the phase change between the two beams and thereby a measurement of the temperature of the wafer W, as described by Equation (33).

While the invention has been described with respect to several preferred embodiments, it will be appreciated that many other variations, modifications and applications of the invention may be made.

What is claimed is:

1. A method of measuring temperature, comprising:
   subjecting, to the temperature to be measured, a light-transmissive body of a material whose dimensions change in response to temperature;
   directing first rays of light from a light source through a first path including a predetermined distance of travel through said light-transmissive body;
   simultaneously directing second rays of light from said light source through a second path, parallel to said first path and of a linear length equal to that of said first path, but not including said predetermined distance of travel through said light transmissive body;
   and measuring the change in phases between said first and second light rays at the ends of said first and second paths, to thereby provide a measurement of the temperature to which said light-transmissive body was subjected.

2. The method according to claim 1, wherein said light-transmissive body is of a material whose index of refraction also changes in response to temperature.

3. The method according to claim 1, wherein said light-transmissive body is sapphire.

4. The method according to claim 1, wherein said light-transmissive body includes a gap of another light-transmissive material which gap is in said second path but not in said first path.

5. The method according to claim 4, wherein said gap is of air.

6. The method according to claim 4, wherein said light-transmissive body includes a first 45° reflector surface at one end thereof for reflecting said first and second rays through said light-transmissive body via said first and second paths, respectively; and a second 45° reflector surface at the opposite end of the light-transmissive body for reflecting said first and second rays to a common detector.

7. The method according to claim 4, wherein said light-transmissive body includes: a 45° reflector surface at one end thereof for reflecting said first and second rays through said light-transmissive body via said first and second paths; and a 90° reflector surface at the opposite end of the light-transmissive body for reflecting said first and second rays back through said first and second paths to a common detector at the light-source end of the light-transmissive body.

8. The method according to claim 1, wherein:
   said first light rays are directed to pass through the surface of the light-transmissive body facing the light source and to be reflected from the opposite surface of the light-transmissive body back through said body to a detector;
   and said second light rays are directed to be reflected from said surface of the light-transmissive body facing the light source to said detector.

9. The method according to claim 8, wherein said opposite surface of the light-transmissive body includes an interface having an amplitude-reflection coefficient which is approximately equal to that of the interface at said surface of the light-transmissive body facing the light source.

10. The method according to claim 9, wherein said light-transmissive body is sapphire, said interface at the surface of the light-transmissive body facing the light source is an air-sapphire interface, and said interface at the opposite surface of the light-transmissive body is a sapphire-silicon interface.

11. Apparatus for measuring temperature, comprising:
    a light-transmissive body of a material whose dimensions change in response to temperature;

means for supporting said light-transmissive body in the region of the temperature to be measured;

a light source;

optical means for directing first rays of light from said light source through a first path including a predetermined distance of travel through said light-transmissive body, and simultaneously for directing second rays of light from said light source through a second path, parallel to said first path and of a linear length equal to that of said first path, but not including said predetermined distance of travel through said light-transmissive body;

and measuring means for measuring the change in phases between said first and second light rays at the ends of said first and second paths, to thereby provide a measurement of said temperature.

12. The apparatus according to claim 11, wherein said light-transmissive body is of a material whose index of refraction also changes in response to temperature.

13. The apparatus according to claim 11, wherein said light-transmissive body is sapphire.

14. The apparatus according to claim 11, wherein said light-transmissive body includes a gap of another light-transmissive material which gap is in said second path but not in said first path.

15. The apparatus according to claim 14, wherein said gap is of air.

16. The apparatus according to claim 14, wherein said light-transmissive body includes a first 45° reflector surface at one end thereof for reflecting said first and second rays through said light-transmissive body via said first and second paths, respectively; and a second 45° reflector surface at the opposite end of the light-transmissive body for reflecting said first and second rays to a common detector.

17. The apparatus according to claim 14, wherein said light-transmissive body includes: a 45° reflector surface at one end thereof for reflecting said first and second rays through said light-transmissive body via said first and second paths; and a 90° reflector surface at the opposite end of the light-transmissive body for reflecting said first and second rays back through said first and second paths to a common detector at the light-source end of the light-transmissive body.

18. The apparatus according to claim 11, wherein:

said first light rays are directed to pass through the surface of the light-transmissive body facing the light source and to be reflected from the opposite surface of the light-transmissive body back through said body to a detector;

and said second light rays are direct to be reflected from said surface of the light-transmissive body facing the light source to said detector.

19. The apparatus according to claim 18, wherein said opposite surface of the light-transmissive body includes an interface having an amplitude-reflection coefficient which is approximately equal to that of the interface at said surface of the light-transmissive body facing the light source.

20. The apparatus according to claim 19, wherein said light-transmissive body is sapphire, said interface at the surface of the light-transmissive body facing the light source is an air-sapphire interface, and said interface at the opposite surface of the light-transmissive body is a sapphire-silicon interface.

* * * * *